US012646022B2

(12) United States Patent
Sohlberg et al.

(10) Patent No.: US 12,646,022 B2
(45) Date of Patent: Jun. 2, 2026

(54) METHOD FOR HANDLING STATE MACHINES OF PRODUCTION ASSETS

(71) Applicant: Volvo Truck Corporation, Gothenburg (SE)

(72) Inventors: Per Sohlberg, Hovås (SE); Bo Strömberg, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 97 days.

(21) Appl. No.: 18/519,428

(22) Filed: Nov. 27, 2023

(65) Prior Publication Data

US 2024/0185148 A1    Jun. 6, 2024

(30) Foreign Application Priority Data

Dec. 6, 2022    (EP) ..................................... 22211636

(51) Int. Cl.
G06Q 10/0631      (2023.01)
(52) U.S. Cl.
CPC .............................. G06Q 10/06312 (2013.01)
(58) Field of Classification Search
None
See application file for complete search history.

(56) References Cited

U.S. PATENT DOCUMENTS

| | | | |
|---|---|---|---|
| 8,666,936 B2 | 3/2014 | Wallace | |
| 10,324,433 B2 | 6/2019 | Sprock et al. | |
| 2005/0052290 A1* | 3/2005 | Naden .................. | G06Q 10/087 |
| | | | 340/993 |

(Continued)

FOREIGN PATENT DOCUMENTS

| | | | | |
|---|---|---|---|---|
| AU | 2021201857 A1 | * | 10/2021 | .............. E02F 9/265 |
| DE | 102021206027 A1 | * | 12/2022 | .............. E02F 9/205 |

OTHER PUBLICATIONS

Ha, Paul, et al. "Vehicle connectivity and automation: A sibling relationship." Frontiers in Built Environment 6 (2020): 590036. (Year: 2020).*

(Continued)

*Primary Examiner* — Brian M Epstein
*Assistant Examiner* — Derick J Holzmacher
(74) *Attorney, Agent, or Firm* — Sage Patent Group

(57)              ABSTRACT

A computer implemented method for handling respective state machines of a plurality of production assets. Each state machine implements a plurality of operating states, in a production process. The computer implemented method comprising determining a respective production process for the plurality of production assets by monitoring the plurality of production assets, and associating a respective state machine to the plurality of production assets based on the determined respective production process. The computer implemented method further comprises detecting that at least two of the plurality of production assets shares a same production process. The computer implemented method further comprises performing an override, based on a respective maturity level of the at least two production assets, to override the operating state of a first production assets of the at least two production assets with an operating state of a second production asset, in which the second production asset is associated with a higher maturity level than the first production asset.

13 Claims, 4 Drawing Sheets

1

(56)　　　　　References Cited

U.S. PATENT DOCUMENTS

| | | | | |
|---|---|---|---|---|
| 2007/0265866 A1* | 11/2007 | Fehling | .................. | G06Q 10/08 |
| | | | | 340/506 |
| 2008/0084324 A1* | 4/2008 | Wallace | ................. | G06Q 10/06 |
| | | | | 340/679 |
| 2008/0084333 A1* | 4/2008 | Forrest | .................. | G06Q 50/08 |
| | | | | 340/989 |
| 2008/0084334 A1* | 4/2008 | Ballew | .................. | G06Q 40/08 |
| | | | | 340/572.1 |
| 2008/0086320 A1* | 4/2008 | Ballew | .................. | G06Q 10/00 |
| | | | | 705/342 |
| 2008/0086322 A1* | 4/2008 | Wallace | ................. | G06Q 10/06 |
| | | | | 705/342 |
| 2008/0086323 A1* | 4/2008 | Petrie | .................... | G06Q 10/10 |
| | | | | 705/342 |
| 2008/0086349 A1* | 4/2008 | Petrie | .................. | G06Q 10/063 |
| | | | | 705/7.11 |
| 2008/0086391 A1* | 4/2008 | Maynard | ............... | G06Q 10/00 |
| | | | | 705/28 |
| 2008/0086427 A1* | 4/2008 | Wallace | ................. | G06Q 10/10 |
| | | | | 705/36 R |
| 2008/0086428 A1* | 4/2008 | Wallace | ................. | G06Q 10/06 |
| | | | | 705/36 R |
| 2008/0086497 A1* | 4/2008 | Wallace | ................. | G06Q 10/00 |
| | | | | 707/999.102 |
| 2008/0086508 A1* | 4/2008 | Ballew | .................. | G06Q 10/10 |
| 2008/0086685 A1* | 4/2008 | Janky | .................. | G06Q 10/087 |
| | | | | 715/700 |
| 2010/0145865 A1* | 6/2010 | Berger | .................. | G06Q 10/08 |
| | | | | 340/572.1 |
| 2011/0282631 A1* | 11/2011 | Poling | .................. | G06Q 10/10 |
| | | | | 702/188 |
| 2012/0296579 A1* | 11/2012 | Poling | .................. | G06Q 10/06 |
| | | | | 702/50 |
| 2015/0046229 A1* | 2/2015 | Gollu | .............. | G06Q 10/06393 |
| | | | | 705/337 |
| 2016/0076225 A1* | 3/2016 | Atkinson | ............. | G01S 13/931 |
| | | | | 701/50 |
| 2016/0142868 A1* | 5/2016 | Kulkarni | ................ | H04W 4/80 |
| | | | | 455/456.5 |
| 2016/0163088 A1* | 6/2016 | Clar | ....................... | G06T 17/05 |
| | | | | 701/23 |
| 2018/0321356 A1* | 11/2018 | Kulkarni | ........... | H04W 64/003 |
| 2018/0330293 A1* | 11/2018 | Kulkarni | ........... | G06K 7/10366 |
| 2018/0332434 A1* | 11/2018 | Kulkarni | ............... | H04L 43/08 |
| 2018/0361994 A1* | 12/2018 | Seaman | .................. | G01S 19/20 |
| 2019/0127985 A1* | 5/2019 | Dundorf | ............. | G05D 1/0038 |
| 2020/0193196 A1* | 6/2020 | Saydag | ............... | G06V 10/764 |
| 2021/0174279 A1* | 6/2021 | Hill | .................. | G06Q 10/06313 |
| 2021/0295226 A1* | 9/2021 | Walker | ............ | G06Q 10/06313 |
| 2021/0318666 A1* | 10/2021 | Brockhurst | ............ | G06N 5/025 |
| 2022/0100595 A1* | 3/2022 | Shapiro | ........... | G06Q 10/06312 |
| 2023/0056673 A1* | 2/2023 | Ghosh | .................... | G06F 30/10 |

OTHER PUBLICATIONS

Extended European Search Report for European Patent Application No. 22211636.0 , mailed May 23, 2023, 5 pages.

* cited by examiner

METHOD FOR HANDLING STATE MACHINES OF PRODUCTION ASSETS

CROSS REFERENCE TO RELATED APPLICATION

This application claims foreign priority to European Application No. 22211636.0 filed on Dec. 6, 2022, the disclosure and content of which is incorporated by reference herein in its entirety.

TECHNICAL FIELD

The disclosure relates to a control unit and a method for handling respective state machines for a plurality of production assets. The disclosure further relates to a computer program, and a computer program product.

The disclosure can be applied for heavy-duty vehicles, such as trucks, buses and construction equipment.

BACKGROUND

Larger infrastructure projects and distribution systems for goods normally involve many different entities which perform respective subtasks in complex interdependency. For instance, in a mass excavation project excavators dig out material which is then transported away from the work site to a material deposit site by dump trucks. The deposit site, the dump trucks, and the excavators all have their respective capacities which need to the matched to each other in order to maintain a high project efficiency.

There is desire to monitor the degree of efficiency that is currently being achieved in a given project, both on the production asset level as well as on application task level and project level, and to present the analysis results to the relevant stakeholder. Some example projects where this is desirable include, e.g., large construction projects, mass excavation projects, and large-scale mining operations. As we are moving towards an increasing number of connected devices, the so-called Internet of Things (IOT), more operational data will be able to be delivered from equipment's. Management systems for this purpose that are easy to use, and which do not require extensive production asset upgrades are therefore desired. Since large infrastructure projects often involve equipment for different manufacturers and of different age, it is furthermore desired that the management systems are agnostic to the equipment type and the brand that are used in a given project.

SUMMARY

An object of the disclosure is to improve the productivity of a production process.

According to a first aspect, the above object is achieved by a method according to claim 1. Hence, there is provided a computer implemented method for handling respective state machines of a plurality of production assets. Each state machine implements a plurality of operating states in a production process. The method comprising:

determining a respective production process for the plurality of production assets by monitoring the plurality of production assets, and associating a respective state machine to the plurality of production assets based on the determined respective production process, detecting that at least two of the plurality of production assets shares the same production process, performing an override, based on a respective maturity level of the at least two production assets, to override an operating state of a first production asset of the at least two production assets with an operating state of a second production asset or the at least two production assets, which second production asset is associated with a higher maturity level than the first production asset.

This results in an improved state machine for production assets with a lower maturity. A state machine for a production asset with a lower maturity, such as the first production asset, may benefit from state machines for production assets with a higher maturity level, such as the second production asset, by inheriting operating state data from said state machines, as long as the production assets shares the same production process. Inheriting the operating state data is done by performing an override of the operating state data of the first production asset with operating state data of the second production asset. Thus, the state machine of the first production asset benefits from the higher maturity level of the second production asset, and an improved state machine is achieved. The operating state data from the improved state machine may be used to improve the productivity of the production process shared by all production assets sharing the same production process.

Optionally, to override an operating state comprises generating a digital sibling of the operating state of the second production asset and applying the digital sibling of the operating state of the second production asset to a corresponding operating state of the first production asset, wherein the first production asset inherits operating state data from the second production asset. By inheriting operating state data from the second production asset, the state machine of the first production asset is improved. This since the operating state that has inherited operating state data now comprises additional operating state data. This may result in improved feedback of the productivity of the first production asset.

Optionally, the digital sibling of the operating state of the second production asset comprises at least a part of the operating state of the second production asset, and wherein overriding an operating state comprises applying the digital sibling of the operating state of the second production asset to the corresponding parts of the corresponding operating state of the first production assets.

Optionally, the method further comprises maintaining the respective state machines of the plurality of production assets by obtaining operating state data from the plurality of production assets, and updating the respective state machines of the plurality of production assets with the obtained operating state data. Maintaining may e.g., mean keeping the respective state machines updated with the latest available operating state data. By maintaining the respective state machines, a current productivity level may always be obtained from the operating state data. Thus, the productivity of a production asset may be monitored at all times.

Optionally, the operating state data is obtained according to a configuration in the respective production asset of plurality of production assets, which configuration is based on any one or more out of:

the maturity level of the respective production asset, the production process of the respective production asset, and the type of production asset.

Optionally, a production process is related to a route of a respective production assets.

Optionally, a maturity level of a production asset of the plurality of production assets is associated to one or more capabilities of the production asset. E.g., a higher maturity level may be associated with more, or more advanced/comprehensive, capabilities than a lower maturity level. Thus, a production asset associated with a lower maturity level may benefit from a production asset with a higher maturity level e.g., by overriding an operating state with operating state data from the more mature production asset.

Optionally, the one or more capabilities is the capability to report operating state data to a control unit, wherein a higher maturity level is associated to more comprehensive reporting capability than a lower maturity level, and wherein the state data comprises any one or more out of:

an operation currently performed,
a position,
a route, and
a fuel level.

Additionally, or alternatively, the state may comprise any one or more out of:

a weight, e.g., weight of the production asset and/or weight of goods carried,
a volume related to cargo carried by the production asset, e.g., the currently carried volume and/or the amount of available volume,
a temperature, e.g., a temperature of the environment surrounding the production asset, and/or a temperature of carried cargo,
an acceleration,
a charge level of a battery,
an altitude,
an inclination of the road,
a curvature of the road,
one or more parameters related to road conditions, e.g., friction, vibration, and/or suspension movements, and
pictures, e.g., to enable generation of a geospatial map.

Any of the above mention operating state data may be obtained, or derived, from one or more sensors located on a production asset. A sensor may e.g., be camera, a laser sensor, a Light Detection and Ranging (LIDAR) sensor, a weight sensor, a temperature sensor, an accelerometer, a fuel sensor, an altitude sensor, a positioning sensor, a velocity sensor, a steering angle sensor, a battery charge level sensor, or any other suitable sensor. That a higher maturity level is associated to more comprehensive reporting capability than a lower maturity level, may e.g., further mean that a higher maturity level is associated with a more comprehensive capability to obtain operating state data than a lower maturity level. E.g., a production asset with a higher maturity level may have the capability to obtain a larger number of different types of operating state data, e.g., from the ones mentioned above, than a production asset with a lower maturity level. In some examples, operating state data may be derived, such as calculated or estimated, from data obtained from one or more sensors.

E.g., an altitude, a road inclination and/or a road curvature may be derived from a position of a production asset and geospatial map. Another example may be that an available volume, e.g., free space, may be derived from a weight sensor in combination with a camera, laser sensor and/or a lidar sensor.

As can be seen above, there is many different types of operating state data. Since a higher maturity level may associated with more, or more advanced/comprehensive, capabilities, e.g., capabilities to report operating state data, than a lower maturity level, a state machine of production asset associated with a lower maturity level will be improved when inheriting data from an operating state of a state machine of a production asset associated with a higher maturity level. E.g., an energy consumption of certain route segment may be estimated for the first production asset based operating state data e.g., inherited from the second production asset. This may make it possible to optimize a production process, e.g., based on when a production asset needs to charge batteries or refill a fuel tank.

Optionally, the method further comprises generating, based on operating state data obtained from the respective state machines of the plurality of production assets, production process data for the plurality of production assets. Since the first production asset, which is associated with lower maturity level than the second production asset, has had an operating state overridden with an operating state of the second production asset, this may result in an improved production process data of the first production asset. This since the operating state data from the second production asset may be more comprehensive than the operating state data of the first production asset.

According to a second aspect, there is provided a control unit to perform the method according to the first aspect. The control unit may be an electronic control unit.

According to a third aspect, there is provided a computer program comprising program code means for performing the method according to the first aspect, when said program is run on a computer.

According to a fourth aspect, there is provided a computer program medium carrying a computer program comprising program code means for performing the method according to the first aspect, when said program is run on a computer.

According to a fourth aspect, there is provided production asset monitoring system, for handling respective state machines of a plurality of production assets, wherein each state machine implements a plurality of operating states, in a production process, where the production asset monitoring system is arranged to determine a respective production process for the plurality of production assets by monitoring the plurality of production assets, and associating a respective state machine to the plurality of production assets based on the determined respective production process, detect that at least two of the plurality of production assets shares the same production process, and perform an override, based on a respective maturity level of the at least two production assets, to override an operating state of a first production asset of the at least two production assets with an operating state of a second production asset, which second production asset is associated with a higher maturity level than the first production asset.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the Drawings

DETAILED DESCRIPTION OF EXAMPLE EMBODIMENTS

Figure 1:
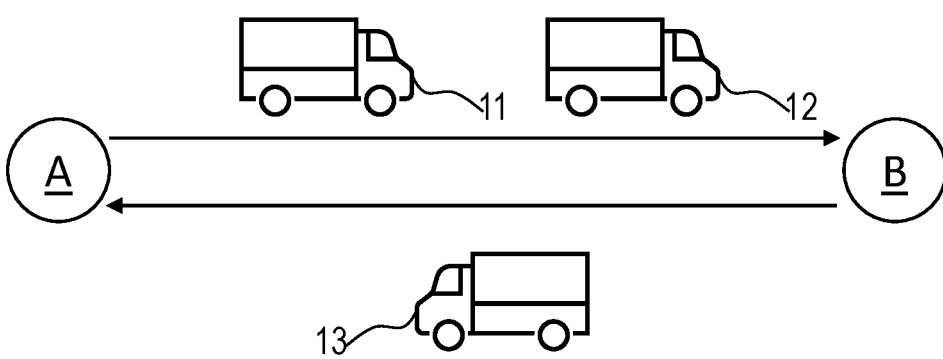
FIG. 1 is a schematic overview of a production assets in a production process.

The disclosure will now be described more fully hereinafter with reference to the accompanying drawings, in which certain aspects of the disclosure are shown. This disclosure may, however, be embodied in many different forms and should not be construed as limited to the embodiments and aspects set forth herein; rather, these embodiments are provided by way of example so that the disclosure will be thorough and complete, and will fully convey the scope of the disclosure to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

FIG. 1 is schematic overview of a plurality of production assets 11, 12, 13 in accordance with embodiments herein. A production asset of the plurality of production assets may be any vehicle or machine, e.g., a dump truck which may be used to transport material away from a mass excavation site (A), for instance as part of a larger infrastructure project such as a road construction project, a tunnel construction project, or a building site. An excavator, wheel loader or other form of loading asset (not shown) may be used to load material on the dump truck, which then transports the material away to a destination where the material is unloaded (B). Generally, vehicles or machinery such as dump trucks, excavators and wheel loaders are referred to as production assets herein.

A production asset, e.g., any one of the plurality of production assets 11, 12, 13, such as dump truck, may be associated with a number of different operating states. For example, a dump truck may be associated with a transporting state, a loading state, an unloading state, and a returning state. The transporting state may be when the dump truck is transporting material from one site (A), e.g., a loading site, to another site (B), e.g., an unloading and/or dumping site. The loading and unloading states may be states where the dump truck is loaded and unloaded respectively. The returning state may be when the dump truck is returning from site (B) to site (A), such as after unloading material at the unloading and/or dump site. Other operating states may e.g., be queuing, such waiting in line at either of site (A) or site (B), a blocked state where the dump truck is prevented from operating or is forced to operate at a reduced speed due to traffic, on-site personnel, or other form of blockage.

As may be seen in FIG. 1, production asset 13 is returning from site (B) to site (A), e.g., returning from the dump site (B) after being unloaded to the loading site (A) where it may be loaded again. Further, production assets 11, 12 are moving from site (A) to site (B), e.g., moving to dump site (B) after being loaded at the loading site (A).

This disclosure relates to various implementations of a respective state machine associated to the plurality of production assets where operating state data may be obtained from the respective predication assets. The state machine of a given production asset may be continuously updated as the production asset is performing different task, or prevented from performing different tasks due to external circumstances, such as a traffic jam, equipment service and maintenance, and equipment failure. Operating state data obtained from the state machines may be used, e.g., by the control unit, for generating production process data. The production process data may e.g., be used for evaluating performance and utilization on both a production asset level and production process level.

The production process data obtained from the control unit may be analysed and presented to relevant stakeholders, e.g., as part of a production monitoring human-machine interface (HMI). The relevant stakeholders may then use the data as a base for decisions for corrective actions and optimizations of the value adding operation that is being analysed. The HMI may also be integrated into a production planning software package, where it may be used to provide important data for improving efficiency of a given project plan.

The plurality of production assets may be configured to report data related that is used by the respective state machines of the plurality of assets to update the respective state machines. The data is also referred to as operating state data. Thus, the operating state data is obtained from the plurality of assets. What operating state data that is obtained from a production asset may depend on the maturity level of the production asset. The higher maturity level, the more comprehensive the obtained operating state data may be. Thus, the respective state machines of the plurality of production assets may differ in the amount of operating state data they hold. This may be problem when e.g., stakeholders want to evaluate the production process of the plurality of production assets. A solution, according to this disclosure, is to let state machines associated to production assets with a lower maturity level inherit operating state data from state machines associated to production assets with a higher maturity level, as long as the production assets shares the same production process. Thus, the operating state of the production asset with lower maturity level is overridden with the operating state of the higher maturity level production asset. This may, e.g., mean that the more comprehensive operating state data obtained from the higher maturity level production asset is added to, and/or at least partly replacing, the operating state data of the lower maturity level production asset. This way the respective state machines of the plurality of production assets comprises operating state data of the same level as the production asset with the highest maturity level.

In other words, in embodiments herein, respective state machines of a plurality of production assets are handled by performing an override to override an operating state of first production asset with the operating state of a second production asset, where the first and the second production assets share the same production process and where the first production asset is associated with a lower maturity level than the second production asset.

Embodiments herein may be performed by a control unit 1. The control unit 1 may be comprised in a remote server or cloud environment. Alternatively, the control unit 1 may be comprised in any other suitable location communicatively coupled remote server or cloud environment, e.g., one of the plurality of production assets 11, 12, 13.

Figure 2:
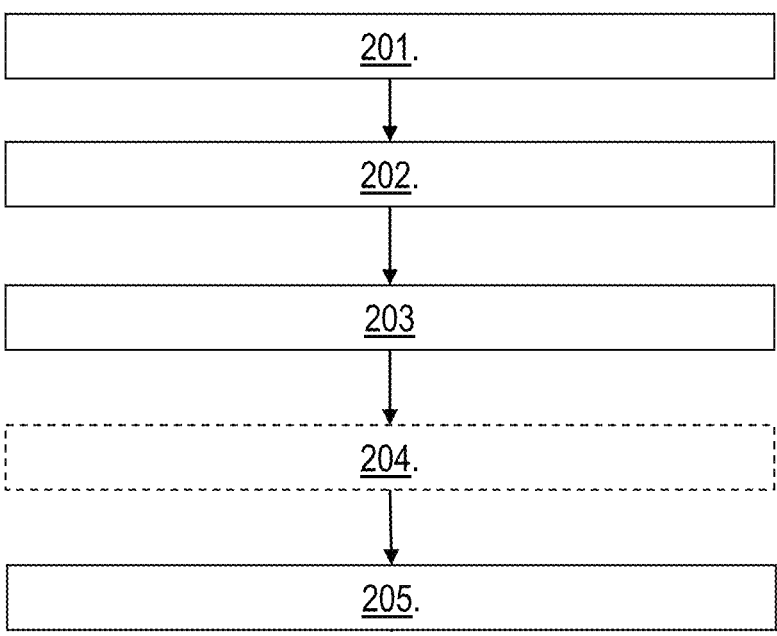
FIG. 2 is a flowchart illustrating a method according to embodiments herein.

FIG. 2 illustrates computer implemented method for handling respective state machines of a plurality of production assets 11, 12, 13. Each state machine implements a plurality of operating states, in a production process. The computer implemented method may e.g., be executed in a production asset monitoring system. The method comprises the following actions described below, which actions may be taken in any suitable order. Optional actions are indicated by dashed boxes in FIG. 2.

Action 201

The method comprises determining a respective production process for the plurality of production assets 11, 12, 13 by monitoring the plurality of production assets 11, 12, 13, and associating a respective state machine to the plurality of production assets 11, 12, 13 based on the determined respective production process. This may mean that the state machine associated to a production asset, e.g., any one of the plurality of production assets 11, 12, 13, may differ from the state machine associated to another production asset when determined that the respective production processes are different.

In some embodiments, a production process is related to a route of a respective production assets 11, 12, 13.

Action 202

The method comprises detecting that at least two of the plurality of production assets 11, 12, 13 shares the same production process. Detecting that at least two of the plurality of production assets 11, 12, 13 shares the same production process may, in some embodiments, comprise comparing the respective state machines associated to the plurality of production assets 11, 12, 13. When at least two of the plurality of production assets have identical respective state machines associated to them, it may be determined that the at least two production assets share the same production process.

Action 203

The method comprises performing an override, based on a respective maturity level of the at least two production asset 11, 12, to override an operating state of a first production assets 11 of the at least two production assets 11, 12 with an operating state of a second production asset 12. The second production asset 12 is associated with a higher maturity level than the first production asset 11. Override an operating state of the first production assets 11 of the at least two production assets 11, 12 with an operating state of the second production asset 12 may e.g., mean that operating state data of an operating state of the state machine associated to the second production asset 12 is added to, and/or a least partly replacing, operating state data of an operating state of the state machine associated to the first production asset 11. When detected that more than two production assets of the plurality of production assets 11, 12, 13 share the same production process, at least one, e.g., the first production asset 11, of the more than two production assets, may be associated with the other of the more than two production assets, e.g., the second production assets 12, and a third production asset 13. In such an example, to perform an override of the operating state of the first production asset 11 may comprise to override the operating state of the first production asset 11 with the operating state of both the second production asset 12 and the third production asset 13. Further, according to this example, the second production asset 12 and the third production asset 13 may by associated with the same maturity level, or they may be associated with different maturity levels. This may mean that operating state data from both the second production asset 12 and the third production asset 13 is added to, and/or a least partly replacing, operating state data of an operating state of the state machine associated to the first production asset 11.

Alternatively, or additionally, when detected that more than two production assets of the plurality of production assets 11, 12, 13 share the same production process, at least two, e.g., the first production asset and the third production asset 13, are associated with a lower maturity level than the second production asset. In such an example, to perform an override of the operating state of the first production asset 11 may comprise to override the operating state of the first production asset 11 and the third production asset with the operating state of the second production asset 12. This may mean that operating state data from the second production asset 12 is added to, and/or a least partly replacing, operating state data of an operating state of the state machine associated to the first production asset 11 and of an operating state of the state machine associated to the third production asset 13.

Alternatively, or additionally, the two previous examples may be combined, e.g., when the first production asset 11, the second production asset 12 and the third production asset 13 are all associated to different maturity levels. In such an example, the first production asset 11 may be associated with the lowest maturity level, the second production asset 12 with the highest maturity level and the third production asset 13 with a maturity level between the highest and the lowest. Then, to perform the override may comprise to override the operating state of the first production asset 11 with an operating state of the second production asset 12 and the third production asset 13, and further to override the operating state of the third production asset 13 with an operating state the second production asset 12. This may mean that operating state data from both the second production asset 12 and the third production asset 13 is added to, and/or a least partly replacing, operating state data of an operating state of the state machine associated to the first production asset 11, and further that operating state data of an operating state of the state machine associated to the second production asset 12 is added to, and/or a least partly replacing, operating state data of an operating state of the state machine associated to the third production asset 13.

In some embodiments, to override an operating state comprises generating a digital sibling of the operating state of the second production asset 12 and applying the digital sibling of the operating state of the second production assets 12 to a corresponding operating state of the first production assets 11. The first production assets 11 inherit operating state data from the second production assets 12. Additionally, or alternatively, the digital sibling is a digital sibling of the state machine of the second production asset 12. That is, the digital sibling comprises all the operating states of the state machine associated to the second production asset 12. Further, the digital sibling may be update when be updated when the state machine is updated, and thus the updates may my further by applied to the corresponding operating state of the state machine associated to the first production asset 11. A digital sibling may mean a copy, or duplicate, of an operating state of a state machine. Or as mentioned, a copy of all operating states in a state machine. In other words, by generating a digital sibling an operating state, or operating state data of an operating state, of the state machine associated to the second production asset 12 may by applied to a corresponding operating state of the state machine associated to the first production asset 11.

In some embodiments, the digital sibling of the operating state of the second production assets 12 comprises at least a part of the operating state of the second production assets 12. Overriding an operating state may comprise applying the digital sibling of the operating state of the second production assets 12 to the corresponding parts of the corresponding operating state of the first production assets 11.

This may mean that only parts of the operating state, or operating state data of an operating state, is applied to the corresponding operating state of the state machine associated to the first production asset 11. That is, e.g., only parts of the operating state data that is missing from the corresponding operating state of the state machine associated to the production asset 11 is applied to the corresponding state.

In some embodiments, a maturity level of a production asset of the plurality of production assets 11, 12, 13 is associated to one or more capabilities of the production asset.

In some embodiments, the one or more capabilities is the capability to report operating state data to a control unit (1). A higher maturity level is associated to more comprehensive reporting capability than a lower maturity level. The operating state data may e.g., comprise any one or more out of an operation currently performed, a position, a route, a fuel level, and a current velocity.

Action 204

The method may comprise maintaining the respective state machines of the plurality of production assets 11, 12, 13 by obtaining operating state data from the plurality of production assets 11, 12, 13, and updating the respective state machines of the plurality of production assets 11, 12, 13 with the obtained operating state data. The operating state data may be obtained e.g., by wireless communications. This may mean that operating state data is received from the plurality of production assets 11, 12, 13 as wireless messages and/or signalling over a wireless communications network. Any suitable wireless communications technique may be used, such as e.g., Wi-Fi, Long Term Evolution (LTE), LTE-Advanced, 5G, New Radio (NR), 6G, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

In some embodiments, the operating state data is obtained according to a reporting configuration in the respective production assets of plurality of production assets 11, 12, 13. The configuration may e.g., be based on any one or more out of the maturity level of the respective production assets, the production process of the respective production assets, and the type of production asset. The reporting configuration may e.g., comprise a reporting periodicity and/or a type of operating state data to report. E.g, the type of operating state data may depend on a capabilities production asset, meaning what type of operating state data a production asset has the capability to collect and report. Alternatively, or additionally,

Action 205

The method may comprise generating, based on operating state data obtained from the respective state machines of the plurality of production assets 11, 12, 13, production process data for the plurality of production assets 11, 12, 13. As mentioned above, the production process data obtained from the control unit may be analysed and presented to relevant stakeholders, e.g., as part of a production monitoring human-machine interface (HMI). The relevant stakeholders may then use the data as a base for decisions for corrective actions and optimizations of the value adding operation that is being analysed. The HMI may also be integrated into a production planning software package, where it may be used to provide important data for improving efficiency of a given project plan.

The methods will now be further explained and exemplified in below. These below examples may be combined with any suitable embodiment as described above.

Figure 3:
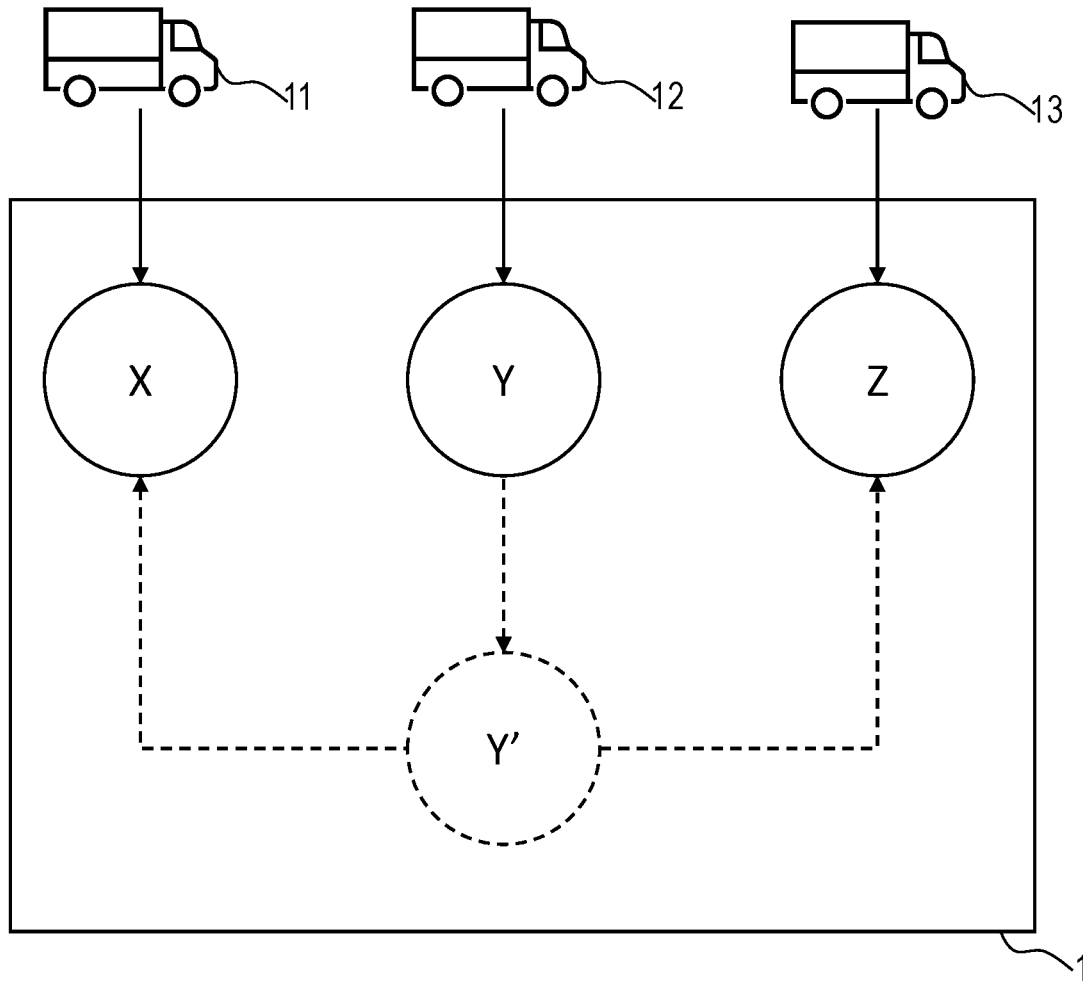
FIG. 3 are illustrations of an example scenario according to embodiments herein.

FIG. 3 illustrates a plurality of production assets 11, 12, 13. The plurality of production assets 11, 12, 13 may in the below example referred to as the first production asset 11, second production asset 12 and third production asset 13. Each of the first production asset 11, second production asset 12 and third production asset 13 is associated with a respective state machine X, Y, Z in the control unit 1. The control unit 1 determines the production process of the each of the first production asset 11, second production asset 12 and third production asset 13. The control unit 1 detect that the first production asset 11, second production asset 12 and third production asset 13 share the same production process. This may e.g., be performed by correlating the determined production processes, and when they are the same, the first production asset 11, second production asset 12 and third production asset 13 are determined to share the same production process. In some examples, the control unit 1 further determines the maturity level of the first production asset 11, second production asset 12 and third production asset 13, e.g., by obtaining production asset data from a memory located in the control unit 1, and/or in a remote server or cloud system. As mentioned above, a higher maturity level may be associated with more comprehensive reporting capability, and/or operating state data obtaining capability, than a lower maturity level. E.g., a production asset with a maturity level, such as the second production asset 12, that is higher than the respective maturity levels of other production assets, such as the first production asset 11 and the third production asset 13. According to such an example, the second production asset 12 may have a more comprehensive reporting capability than the first production asset 11 and the third production asset 13. As an example, the second production asset 12 may be able to report an operation currently performed, a position, fuel level, a road inclination, and an altitude of the second production asset 12. The first production asset 11 and the third production asset 13 may be able to respectively report a position and a fuel level. Operation state data for the respective state machine X, Y, Z may be obtained by the control unit 1. The operational state data may e.g., by obtained from the first production asset 11, second production asset 12 and third production asset 13 by wireless communication between the control unit 1 and respective first production asset 11, second production asset 12 and third production asset 13. The obtained operation state data may be used to update the respective state machine X, Y, Z. In the present example, the control unit 1 has determined that the second production asset 12 is associated with a maturity level that is higher than the maturity level associated with the first production asset 11 and the third production asset 13. Further, it has been determined that the first production asset 11 and the third production asset 13 is associated with the same maturity level. The control unit 1, after determining the respective maturity levels of the first production asset 11, second production asset 12 and third production asset 13, may generate a digital sibling Y' of the state machine Y associated to the second production asset 12. The digital sibling Y' is a copy of the state machine Y, and thus comprises the same operating states and operating state data as the state machine Y. Since the first production asset 11 and the third production asset 13 are associated with a lower maturity level than the second production asset 12, the control unit overrides operating state data of the respective state machines X, Z with operating state data of the digital sibling Y'. Thus, operating state data of an operating state from the digital sibling Y' is applied to the corresponding operating state of the respective state machines X, Z. Further, the control unit 1 may maintain, such as e.g., update, the respective state machines X, Y, Z whenever new operating state data is obtained from the first production asset 11, the second production asset 12 and/or the third production asset 13. Then, the control unit 1 may further update the digital sibling Y' and again perform the override of the operating state of the respective state machines X, Z.

To perform the method actions described herein, the control unit 1 may be configured to perform any one or more of the above actions 201-205 or any of the other examples or embodiments herein. The control unit 1 may for example comprise an arrangement depicted in FIGS. 4a and 4b.

The control unit 1 may comprise an input and output interface 400 configured to communicate with any necessary components or entities of embodiments herein. The input and output interface 400 may comprise a wireless and/or wired receiver (not shown) and a wireless and/or wired transmitter (not shown). The control unit 1 may be arranged in any suitable location, e.g., a remote server and/or a cloud service. The control unit 1 may use the input and output interface 400 to control and communicate with the plurality of production assets 11, 12, 13 by using any one or more out of: cellular communications network, Wi-Fi, Bluetooth, and/or other network interfaces.

The control unit 1 may be configured to, e.g., by means of a determining unit 401 in the control unit 1, determine a respective production process for the plurality of production assets 11, 12, 13 by monitoring the plurality of production assets 11, 12, 13, and associate a respective state machine to the plurality of production assets 11, 12, 13 based on the determined respective production process.

The control unit 1 may be configured to, e.g., by means of a detecting unit 402 in the control unit 1, detect that at least two of the plurality of production assets 11, 12, 13 share the same production process.

The control unit 1 may be configured to, e.g. by means of a performing unit 403 in the control unit 1, perform an override, based on a respective maturity level of the at least two production assets 11, 12, to override an operating state of a first production assets 11 of the at least two production assets 11, 12 with an operating state of a second production asset 12, which second production asset 12 is associated with a higher maturity level than the first production asset 11.

The control unit 1 may be configured to, e.g., by means of a maintaining unit 404 in the control unit 1, maintain the respective state machines of the plurality of production assets 11, 12, 13 by obtaining operating state data from the plurality of production assets 11, 12, 13, and updating the respective state machines of the plurality of production assets 11, 12, 13 with the obtained operating state data.

The control unit 1 may be configured to, e.g., by means of a generating unit 405 in the control unit 1, generate, based on operating state data obtained from the respective state machines of the plurality of production assets 11, 12, 13, production process data for the plurality of production assets 11, 12, 13.

Figure 4A:
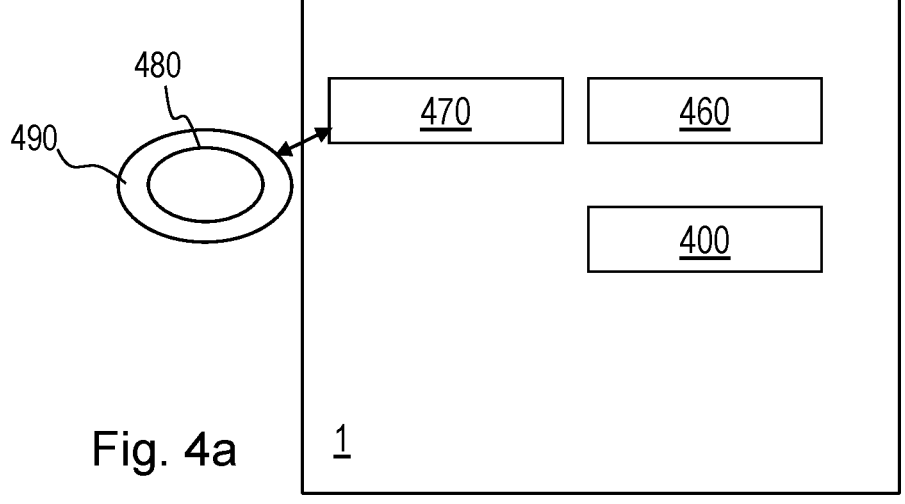
FIG. 4a-4b are schematic block diagrams illustrating a control unit according to embodiments herein.
Figure 4B:
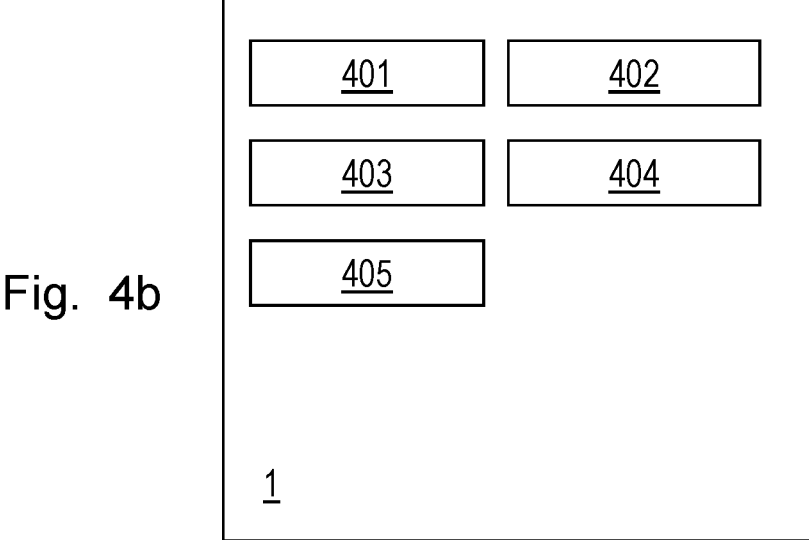

The embodiments herein may be implemented through a processor or one or more processors, such as the processor 460 of a processing circuitry in the control unit 1 depicted in FIG. 4a, together with computer program code for performing the functions and actions of the embodiments herein. The program code mentioned above may also be provided as a computer program medium, for instance in the form of a data computer readable medium carrying computer program code for performing the embodiments herein when being loaded into the control unit 1. One such computer readable medium may be in the form of a memory stick. The computer program code may furthermore be provided as pure program code on a server and downloaded to the control unit 1.

The control unit 70 may further comprise a memory 470 comprising one or more memory units. The memory 470 comprises instructions executable by the processor in control unit 1. The memory 470 is arranged to be used to store e.g., information, indications, data, configurations, state machines, operating states, digital sibling, operating state data, and applications to perform the methods herein when being executed in the control unit 1.

In some embodiments, a computer program 480 comprises instructions, which when executed by a computer, e.g., the at least one processor 460, cause the at least one processor of the control unit 1 to perform the actions 201-205 above.

In some embodiments, a computer-readable storage medium 490 comprises the respective computer program 480. The computer-readable storage medium 490 may comprise program code for performing the steps of any one of actions 201-205 above when said program product is run on a computer, e.g., the at least one processor 460.

Those skilled in the art will appreciate that the units in the control unit 1 described above may refer to a combination of analogue and digital circuits, and/or one or more processors configured with software and/or firmware, e.g., stored in the control unit 1, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present disclosure is not limited to the embodiments described above and illustrated in the drawings; rather, the skilled person will recognize that many changes and modifications may be made within the scope of the appended claims.

The invention claimed is:

1. A computer implemented method for handling respective state machines of a plurality of production assets, wherein each state machine implements a plurality of operating states, in a production process, the computer implemented method comprising:

determining, by a control unit, a respective production process for the plurality of production assets by monitoring the plurality of production assets, and associating a respective state machine to the plurality of production assets based on the determined respective production process;

detecting, by the control unit, that at least two of the plurality of production assets share a same production process; and performing, by the control unit, an override, based on a respective maturity level of the at least two production assets, wherein the respective maturity level of a production asset of the plurality of production assets is associated with a capability of the production asset to obtain operating state data via one or more sensors configured to measure one or more physical operating parameters of the production asset, to override an operating state of a first production asset of the at least two production assets with an operating state of a second production asset, in which the second production asset is associated with a higher maturity level comprising a capability to obtain a larger number of different types of operating state data via sensors than the first production asset, by transmitting, via the control unit over a wired or wireless communication link, one or more control instructions to the first production asset that cause the first production asset to transition from its current operating state to the operating state of the second production asset, wherein the one or more control instructions modify a physical operation of the first production asset comprising at least one of transporting, returning, loading, or unloading.

2. The computer implemented method according to claim 1, wherein overriding the operating state comprises: generating a digital sibling of the operating state of the second production asset and applying the digital sibling of the operating state of the second production asset to a corresponding operating state of the first production asset, wherein the first production asset inherits operating state data from the second production asset.

3. The computer implemented method according to claim 2, wherein the digital sibling of the operating state of the second production asset comprises at least a part of the operating state of the second production asset, and wherein overriding the operating state comprises applying the digital sibling of the operating state of the second production asset to a corresponding part of the corresponding operating state of the first production asset.

4. The computer implemented method according to claim 1, further comprising:
maintaining the respective state machines of the plurality of production assets by obtaining operating state data from the plurality of production assets, and updating the respective state machines of the plurality of production assets with the obtained operating state data.

5. The computer implemented method according to claim 4, wherein the operating state data is obtained according to a reporting configuration in respective production assets of the plurality of production assets, in which the reporting configuration is based on any one or more of:
a maturity level of the respective production assets,
the production process of the respective production assets, or
a type of production asset.

6. The computer implemented method according to claim 1, wherein the production process is related to a route of respective production assets.

7. The computer implemented method according to claim 1, wherein the respective maturity level of a production asset of the plurality of production assets is associated with one or more capabilities of the production asset.

8. The computer implemented method according to claim 7, wherein the one or more capabilities include a capability to report operating state data to the control unit, wherein the higher maturity level is associated with more comprehensive reporting capability than a lower maturity level, and wherein the operating state data comprises any one or more of:

an operation currently performed,
a position,
a route, or
a fuel level.

9. The computer implemented method according to claim 1, further comprising:
generating, based on operating state data obtained from the respective state machines of the plurality of production assets, production process data for the plurality of production assets.

10. The control unit comprising processing circuitry configured to perform the computer implemented method according to claim 1.

11. A computer program comprising program code stored on a non-transitory computer readable medium, the program code comprising computer-readable instructions for performing steps of claim 1 wherein said program code is run on a computer or on processing circuitry of the control unit.

12. A non-transitory computer readable storage medium carrying a computer program comprising program code comprising computer-readable instructions for performing steps of claim 1, wherein said program code is run on a computer or on processing circuitry of the control unit.

13. A production asset monitoring system, for handling respective state machines of a plurality of production assets, wherein each state machine implements a plurality of operating states, in a production process, the production asset monitoring system comprises:
a control unit, the control unit is configured to:
determine a respective production process for the plurality of production assets by monitoring the plurality of production assets, and associating a respective state machine to the plurality of production assets based on the determined respective production process;
detect that at least two of the plurality of production assets share a same production process; and
perform an override, based on a respective maturity level of the at least two production assets, wherein the respective maturity level of a production asset of the plurality of production assets is associated with a capability of the production asset to obtain operating state data via one or more sensors configured to measure one or more physical operating parameters of the production asset, to override an operating state of a first production asset of the at least two production assets with an operating state of a second production asset, in which the second production asset is associated with a higher maturity level comprising a capability to obtain a larger number of different types of operating state data via sensors than the first production asset, by transmitting, via the control unit over a wired or wireless communication link, one or more control instructions to the first production asset that cause the first production asset to transition from its current operating state to the operating state of the second production asset, wherein the one or more control instructions modify a physical operation of the first production asset comprising at least one of transporting, returning, loading, or unloading.

* * * * *